United States Patent [19]

Gershenson et al.

[11] Patent Number: 5,799,378
[45] Date of Patent: Sep. 1, 1998

[54] FASTENING SYSTEM

[76] Inventors: Bruce Gershenson, 26645 Irving, Franklin, Mich. 48025; William Gallmeyer, 580 Central Ave., Holland, Mich. 49423

[21] Appl. No.: 788,132

[22] Filed: Jan. 24, 1997

[51] Int. Cl.[6] ............................................. A44B 18/00
[52] U.S. Cl. ........................................................ 24/452
[58] Field of Search ..................... 24/442, 452, 443–451

[56] References Cited

U.S. PATENT DOCUMENTS

| | | |
|---|---|---|
| 3,101,517 | 8/1963 | Fox et al. . |
| 3,824,933 | 7/1974 | Lind . |
| 3,829,938 | 8/1974 | Ballin . |
| 5,097,570 | 3/1992 | Gershenson . |
| 5,212,853 | 5/1993 | Kaneko . |

FOREIGN PATENT DOCUMENTS 264770   9/1968   Austria ................................ 24/452

*Primary Examiner*—James R. Brittain
*Attorney, Agent, or Firm*—Arnold S. Weintraub

[57] ABSTRACT

A fastener having two like plates effects joining through the interdigitation of bulbous heads formed to each plate. The plates have a plurality of intersecting, perpendicular walls. The intersection points of these walls define where heads may be formed thereto. Heads are attached to the plates atop stems formed integrally with the walls. The bulbous nature of the heads and the strength supplied by the formation of the walls allows for a strong yet releasable fastening of the plates.

7 Claims, 3 Drawing Sheets

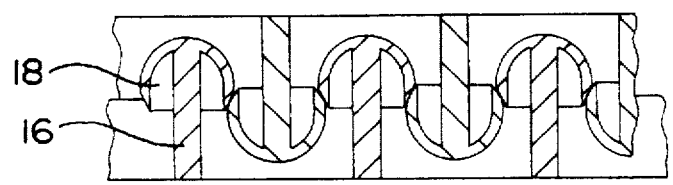
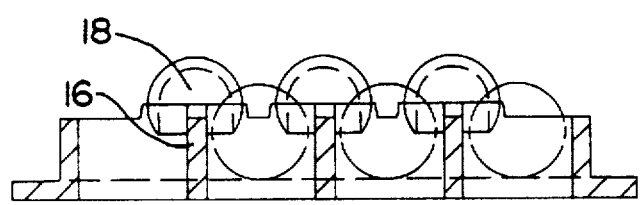
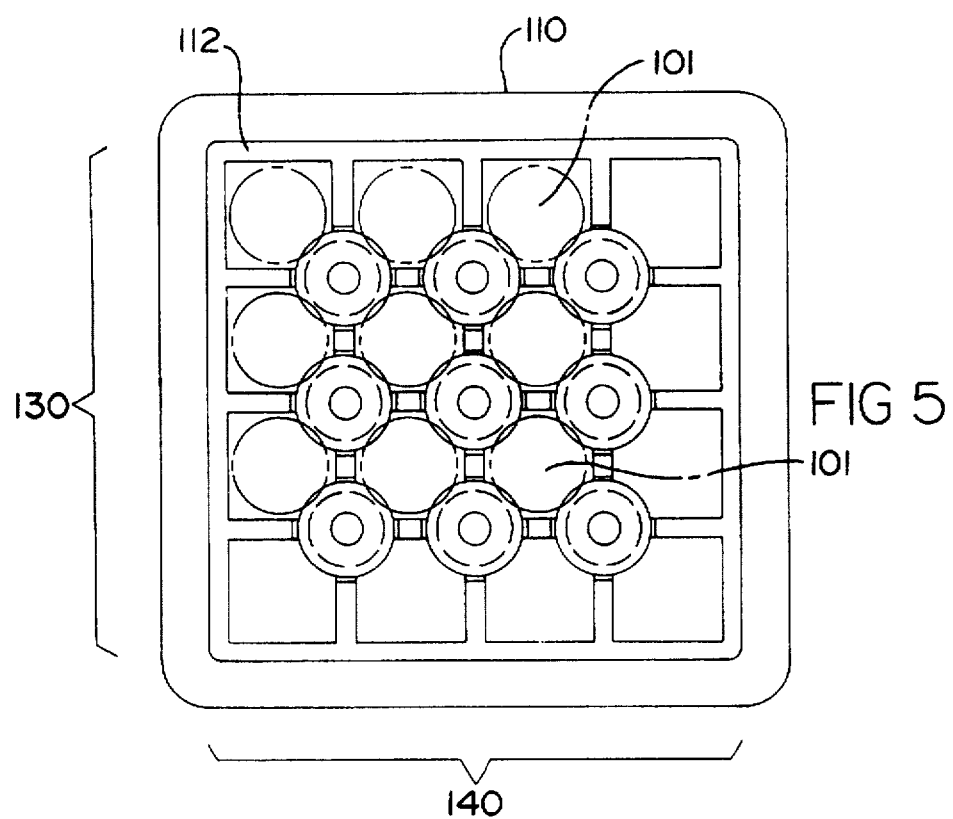

FIG 6
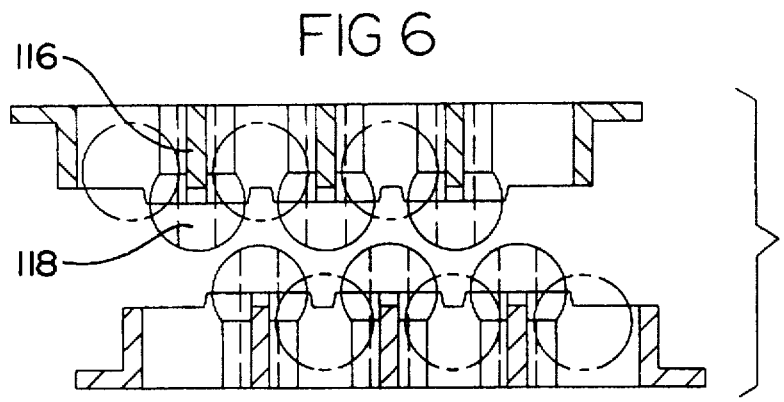
FIG 7
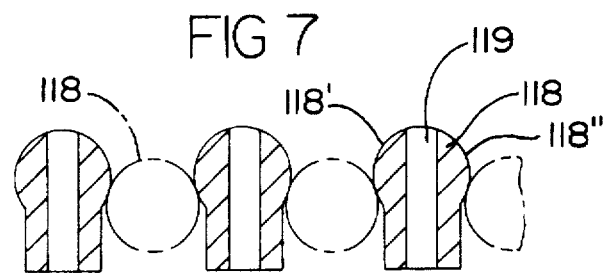
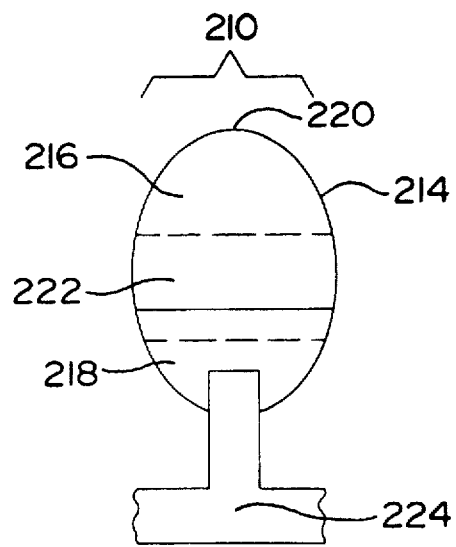
FIG 8

5,799,378

FASTENING SYSTEM

BACKGROUND OF THE INVENTION

CROSS REFERENCE TO PENDING APPLICATIONS

This application is a continuation-in-part of pending U.S. provisional application Ser. No. 60/019,309, filed Jun. 6, 1996 for Fastening Device; the disclosure of which is incorporated herein by reference:

1. Field of the Invention

The present invention relates to fastening systems. More particularly, the present invention concerns interlocking members which cooperate to define a fastening system. Even more particularly, the present invention concerns separable interlocking members which cooperate to define a fastening system.

2. Prior Art

Interlocking fasteners are well known, and different approaches have been made in achieving such systems. The general format for these fasteners is to have a pair of flat members onto which projecting members are formed. A seating space is formed either between two projections, in a one-dimensional array, or between four projections, in a two-dimensional array. One projection from the mating or corresponding member is received therein the seating space, and an interlocking relationship is then established.

One earlier attempt at this type of fastener is found in U.S. Pat. No. 3,101,517 issued to Fox et alia and is entitled "FASTENER". Fox et alia teaches a pair of interlocking members, each member having a 2-dimensional array of projecting members, termed "bosses" by Fox et alia, disposed thereon. Fox discloses a variety of shapes in which the projections may be formed, including rectangular, triangular and cylindrical. The projections in Fox et alia are tapered, reaching a maximum diameter or circumference at the top thereof. This allows for the tops to be snuggly engageable at the foot of the four projections from the opposing member.

A more recent attempt at this type of fastener is found in U.S. Pat. No. 5,097,570 issued to Gershenson and entitled "FASTENING SYSTEM". Gershenson teaches a pair of flat members, each having formed thereon a 2-dimensional array of projections, the projections being termed as "burrs". Each burr comprises a foot portion joined to the flat member, a body portion formed to the foot portion, and a head portion formed to the body portion. The head of a projection or burr is received into a corresponding receiving area defined by four foot portions on the opposing or receiving member. The body portion of each projection is tapered in a decreasing manner from foot to head. This facilitates the insertion of one projection between four receiving projections.

The drawback of the Gershenson system is that the material used to form the members of necessity needs to be a pliable polymer. Once such material loses its elastic qualities, the system becomes less efficient in its operation. Further, deformation of even a small number of projections will result in no fastening occurring in that portion of the system, introducing a failure which could result in the total loss of fastening.

A later attempt to produce such a fastening system is found in U.S. Pat. No. 5,212,853 issued May 25, 1993 to Kaneko. Kaneko teaches a fastener comprising two interlocking pieces. Each member comprises a flat member having a 2-dimensional array of projections formed thereon. Unlike Gershenson, which utilized projections shaped roughly like bowling pins, Kaneko teaches a variety of shapes for its projections, most of which roughly approximate a mushroom form. Each projection comprises a stem formed to the flat member, and a head formed atop the stem. A head being inserted to the receiving or opposite piece is pressed past four heads on the receiving piece. The head is roughly hemispherical; thus, the flat portion of the head is retained snuggly by the four receiving heads. The drawback of this system is that the head, once inserted, is difficult to impossible to extricate without damaging the projections of both the inserting member and the receiving member.

Thus, there exists a need in the art for a fastening system that provides the strength and benefits of 2-dimensional projection-type fastener systems such as Kaneko, but yet which is truly capable of being separated. Further, such a fastening system must be of great strength, to ensure it will endure in potential impact situations, such as on automobiles. It is to these ends of providing a truly separable, yet stronger, interlocking fastener that the present invention is directed.

SUMMARY OF THE INVENTION

The present invention is a fastener comprising a plurality of plates capable of releasable interdigitation, each plate comprising:

a) a first set of walls comprising a plurality of walls of a substantially equal length, any two walls of the first set of walls being spaced apart by a first predetermined distance;

b) a second set of walls comprising a plurality of walls of a substantially equal length, any two walls of the second set of wall being spaced apart by a second predetermined distance, c) a plurality of stems, each one of the plurality being disposed at one intersection point and projecting therefrom; and d) a plurality of heads, each one head of the plurality being disposed on a corresponding stem, the heads collectively cooperating to define a plurality of receiving spaces therein; and further wherein the plates interdigitable by the pressing of the heads of each plate into the receiving spaces of one corresponding plate, such deployment of heads into receiving spaces effecting the interdigitation.

Each stem of the plates, in the preferred embodiment, comprises a pair of cross-members formed adjacent to the walls defining the intersection point at which the stem is deployed. In an alternate embodiment, the stem comprises a pair of members formed along one wall, allowing for a gap to be formed in the head mounted thereto.

Further, each head of the plates comprises an upper portion and a lower portion integrally formed together, the upper portion comprising a hemispherical member complementary formed to the upper portion. Alternately, the head can further have a gap formed therealong a cross-section of the head.

Additionally, the plates may further comprise a border member which is normally and integrally formed thereto to give stability to the plate.

These features of the present invention will be more clearly understood in the following detailed description with reference to the accompanying drawings, in which like reference numerals refer to like part, and in which:

BRIEF DESCRIPTION OF THE DRAWINGS

FIG. 3 is a cross-sectional view taken along line 3—3 of FIG. 2;

FIG. 4 is a cross-sectional view taken along line 4—4 of FIG. 2;

FIG. 5 is a top plan view of a second embodiment of the fastener system hereof;

FIG. 6 is a cross-sectional view taken along line 6—6 of FIG. 5;

FIG. 7 is a cross-sectional view taken along line 7—7 of FIG. 5; and

FIG. 8 is a side elevational view of a further embodiment of a head and stem used in the practice hereof.

DETAILED DESCRIPTION OF THE PREFERRED EMBODIMENT

Figure 1:
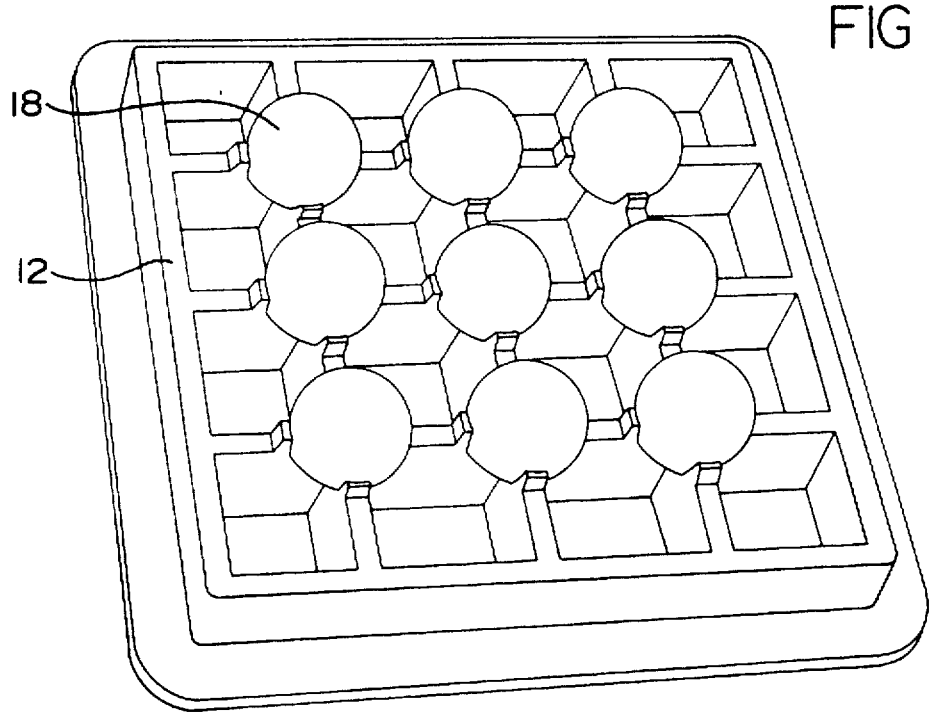
FIG. 1 is a perspective view of a first embodiment of the fastener system of the present invention.
Figure 2:
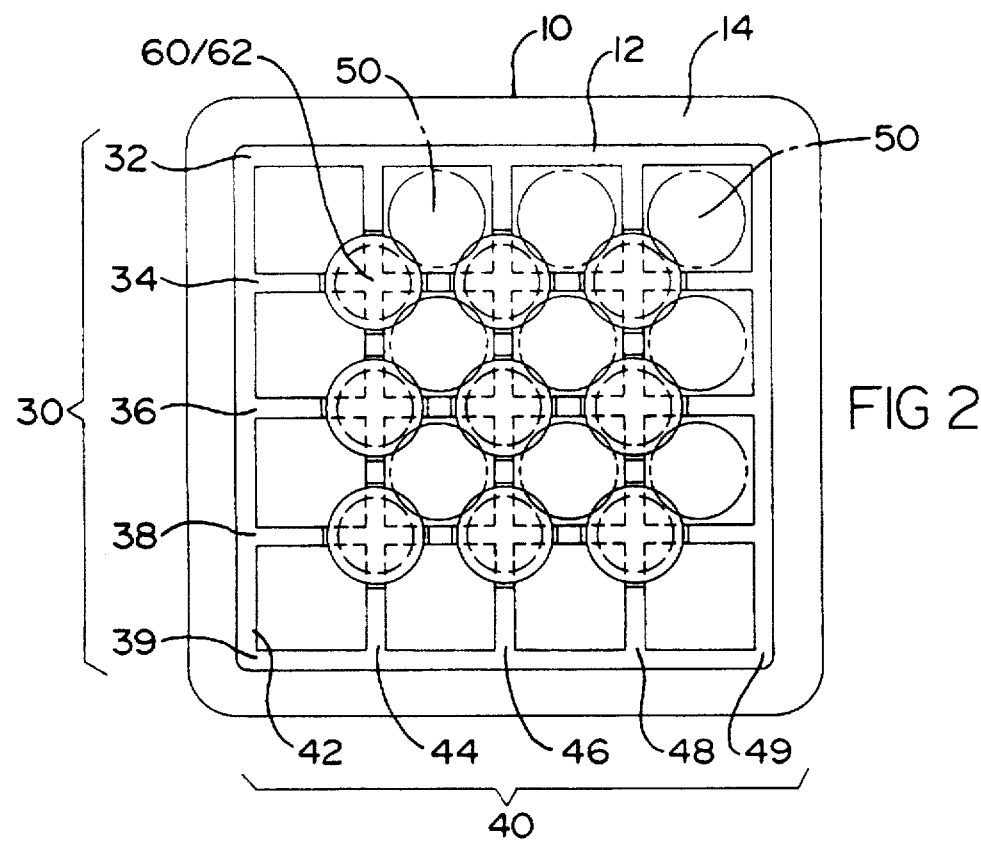
FIG. 2 is a top plan view of a first embodiment of a fastener system in accordance with the present invention.

Now, and with reference to the drawings and in particular to FIGS. 1-4, there is depicted therein a first embodiment of a fastener system 10 in accordance with the present invention. The fastening system 10 comprises a pair of a plates, with an exemplar plate being shown in FIGS. 1-4 and indicated as 12. Each plate 12 is formed substantially normal to a base 14. The plate 12 further has a plurality of stems formed thereto, a representative stem being indicated at 16. The plate 12 further has a plurality of bulbous heads formed thereto, a representative head being indicated at 18, where one bulbous head 18 is formed to each stem 16.

The plate 12, the base 14, the stems 16 and the heads 18 are all formed, in the preferred embodiment, of a durable plastic. The choice of the plastic employed will determine whether the system 10 is releasably fastened or, essentially, permanently joined. The use of harder plastics, such as nylon, will result in a rigid fastening of the plates 12. This system will not be releasable, as attempts to separate the plates will result in the breaking of the heads 18 and/or stems 16 from the plate 12. Alternately, a less rigid plastic being employed, which will allow for the necessary flexibility so as to enable extrication of one plate 12 from another. Regardless of which plastic is chosen, and a wide variety of plastics such as polyolefins, including polyethylene, polypropylene and nylon, ABS resins, TPO elastomers and the like may be selected, the structure of the plates 12 of the preferred embodiment will be the same. As noted, the choice of plastic is dictated by the desired environment for implementation.

The plate 12 comprises two sets of walls 30 and 40, each set comprising a plurality of walls. In the preferred embodiment of FIGS. 1-4, an exemplar member of the first set 30 includes walls 32, 34, 36, 38 and 39 which are parallel to each other and are separated by a substantially equal distance. Each wall 32, 34, 36, 38 and 39 is of a substantially equal length. The second set 40 includes walls 42, 44, 46, 48 and 49 which are parallel to each other and are separated by a substantially equal distance. Each wall 42, 44, 46, 48 and 49 is of a substantially equal length, and that length is the same as the length of the first set 30 of walls 32, 34, 36, 38 and 39. By keeping the length of the first set 30 and the second set 40 of walls of an equal length, the formation of the plate 12 will be of a substantially square form. However, this does not preclude other configurations, such as rectangular, triangular, etc.

The plate 12 is formed by joining the first set 30 of walls and the second set 40 of walls such that the first set 30 of walls is substantially normal to the second set 40 of walls. Again, this substantially perpendicular relationship of the two sets 30, 40 of walls facilitates the formation of the plate 12 in a substantially square formation.

Within each set 30 and 40 of the walls of the plate 12, there are two walls which are, necessarily, outside or exterior walls. In the first embodiment, these exterior walls are shown as 32 and 39 in the first set 30, and are shown as 42 and 49 in the second set 40. It is understood that, in practice, the present invention may comprise sets of a greater or lesser plurality of walls, such that the size of the plate 12 may be increased or decreased. Correspondingly, the number of points of intersection between the plates 12 of the present fastening system 10 will be increased or decreased accordingly, as will be described further herein below.

The two sets 30, 40 of walls are deployed such that each wall 32, 34, 36, 38 and 39 of the first set 30 intersects and contacts each wall 42, 44, 46, 48 and 49 of the second set 40. Each intersection point or junction of the first set 30 of walls and the second set 40 of walls is a potential position for deployment of a stem 16 and a bulbous head 18. In the first embodiment, the principle is followed of not deploying a stem 16 and a bulbous head 18 along any intersection point of an exterior wall 32, 39, 42, 49. An alternate embodiment may incorporate such deployments of stems and bulbs at intersection points along exterior walls, remembering that a symmetry must be maintained between the bulbs 18 of each plate 12, such that proper interdigitation may occur.

A stem 16 is formed at each interior junction or intersection point. Each stem 16 comprises two portions formed to and extending from the intersecting walls. An exemplar stem 16 extends from the wall 38 of the first set 30 and the wall 42 of the second set 40. The stem 16 comprises two cross-members 60,62. These cross-members 60, 62 are formed to the walls forming the point of intersection, e.g. walls 38 and 42. The stem 16 rises up to meet the head 18, which is formed thereto. By being formed of cross-members integrally formed to walls, the fastening system of the present invention offers strength not realized by systems employing independent stems, such as those of a mushroom shape.

A bulbous head 18 has its center point slightly above the juncture or intersection point. The head 18 comprises a complete upper half and a portion of the lower half a sphere. This formation is important, as the additional portion of the lower half of the sphere is critical to the interdigitation of the heads 18 of the present fastening system 10. Integrally formed to the stem 16 along its cross-members 60, 62 the upper half of the head 18 is deployed substantially above the walls 34, 44. Concurrently, the lower portion of the head 18 is formed about the adjacent to the upper edge of the walls 34, 44.

As shown in the drawing, there is provided a space or receiving space 50 between adjacent walls. The heads of an opposed plate (not shown) project into associated spaces 50 to effect interdigitation as explained below.

In use, the first embodiment of the fastening system 10 of the present invention functions by the interdigitation of two like plates 12. The heads 18 of the plates 12 are aligned such that, when pressed together with sufficient force, a plurality of the heads 18 of each plate 12 is snugly received into the receiving spaces 50 defined on the corresponding plate. If release or separation of plates is desired, the strength of the sets 30, 40 of walls and the facilitation of the lower portion of the heads 18 allows the slidable disengagement of the plates 12 without fracturing of the heads 18 from the stems 16, or the stems 16 from the walls and, thus, the plate.

Referring now to FIGS. 5–7, there is depicted therein a second embodiment, denoted as 110. As shown, a plate 112 comprises two sets 130, 140 of walls forming a waffle-like structure having a plurality of intersection points or junctions, similar to the first embodiment with receiving spaces 101 provided therein.

As best shown in FIG. 7, the heads 118 of the plate 112 are formed thereto by stems 116. The stems 116 differ from the first embodiment in that the stems 116 are formed along only one set 130 of walls. No cross-members are formed along the second set 140 of walls. Correspondingly, the heads 118 are formed with a gap 119 directly above the wall of the second set 140 of walls which cooperates to define the intersection point at which the stem and head are deployed.

This gap 119 allows the head 118 to be comprised of two halves 118' and 118", which are compressed together when interdigitation occurs. This flexibility allows for release from fastening while offering increased strength. In all other aspects, the two embodiments of the present invention are alike.

In manufacturing the heads 118 of the second embodiment of the present invention, ejector pins are used during the molding process. The plates 112 are then molded thereabout. Upon withdrawal of the ejector pins from the mold, the central openings or gaps 119 are accomplished.

In FIG. 8, there is depicted a further embodiment, generally, denoted at 216 of a stem 212 and a head 214 advantageously deployed in the practice of the present invention. As shown, the head 214 is a hollow ovoid configuration having an upper portion 216 and a lower portion 218. The upper portion 216 has its greatest curvature at the apex 220 and flattens out or has a reducing curvature toward the lower portion, as shown. As the curvature decreases there is provided an interference area 222. The interference area which an opposed head must past in order to enable interdigitation. The lower portion 218 defines a static contact surface. This configuration provides a decreased push force to lock two opposed plates together over the pull force, i.e. the force necessary to separate the two plates.

The stem 212 projects into the interior of the head and includes a cross-member 224 for structural integrity as described hereinabove.

It should also be noted that although the fasteners have been described as members having either a bulbous hollowed-out head or with an elongated hollow opening, depending on the material of construction, the fastener can be a solid member. It is compressibility and cost of manufacture that dictate whether or not the fastener is hollowed.

Further, it should be noted with respect hereto that the intersecting interior walls and the perimetral edge walls cooperate to define a web which structurally reinforces the fastening system and in particular that area of the system proximate each fastener.

Other modes of structurally supporting each fastener may, therefore, be used in lieu of the web. For example, and although not shown, each fastener may have a brace or braces integrally formed therewith and extending from the stem to the base, and as such it is within the scope hereof.

As hereinabove noted, the plates can have any suitable length and/or width with the concomitant number of projecting fasteners being associated therewith.

In use to define a fastening system, there is provided at least one strip which can be looped back upon itself or at least a pair of strips placed in opposition to each other to cause the fasteners thereof to interdigitate and seat in receiving areas. The strips, depending on the material of construction, can be separable and recessable, or be rendered non-separable.

The fastening system hereof may be used to interlock a wide variety of devices in varying industrial applications, including the automotive field, clothing industry, commercial signage and furniture applications, to name only a prominent few examples.

Having, thus, described the invention, what is claimed is:

1. A fastener system comprising at least two interdigitatable plates, each plate comprising:

a) a first set of walls comprising a plurality of walls of a substantially equal length, any two walls of the first set of walls being spaced apart by a first predetermined distance;

b) a second set of walls comprising a plurality of walls of a substantially equal length, any two walls of the second set of walls being spaced apart by a second predetermined distance, the second set of walls being substantially perpendicular to the first set, each wall of the first set cooperating with each wall of the second set to define an intersection point, the walls further cooperating to define a receiving space therebetween;

c) a plurality of stems, each stem projecting from the plate one intersection point; and d) a plurality of heads, each head being formed to a corresponding stem, each head being a spheroid having a curvilinear surface, and j) wherein the plates are interdigitated by the pressing of the heads of each plate into the receiving spaces of one corresponding plate, and further wherein the curvilinear surface of one head of one plate abuts against the curvilinear surface of one head of the corresponding plate when the plates are interdigitated.

2. The fastener system of claim 1, wherein each stem comprises a pair of cross-members formed adjacent to the walls defining the intersection point at which the stem is deployed.

3. The fastener system of claim 1, wherein each head comprises an upper portion and a lower portion integral therewith, the upper portion comprising a hemi-spherical member and the lower portion comprising a truncated portion of a hemi-spherical member complementarily formed to the upper portion.

4. The fastener system of claim 1 further comprising a border member formed substantially normal to each plate.

5. The fastener system of claim 1, wherein each head comprises an upper portion, and a lower portion integrally formed together, the upper portion comprising a hemi-spherical member complementarily formed to the upper portion, the head further having a gap formed therethrough, such that the head is flexibly compressible.

6. A fastener plate for a fastener system, comprising:

a) a first set of walls comprising a plurality of walls of a substantially equal length, any two walls of the first set of walls being spaced apart by a first predetermined distance;

b) a second set of walls comprising a plurality of walls of a substantially equal length, any two walls of the second set of walls being spaced apart by a second predetermined distance, each wall of the second set being formed substantially perpendicular to the first set, each wall of the first set cooperating with each wall of the second set to define an intersection point, with a receiving space defined therebetween;

c) a plurality of stems, each stem disposed at an intersection point and projecting therefrom; and d) a plurality of heads being formed to a corresponding stem, each head comprising an upper portion and a lower portion integrally formed together, the upper portion comprising a hemi-spherical member and the lower portion comprising a truncated portion of a hemi-spherical member complementary formed to the upper portion;

wherein the plate is interdigitable to a similar plate by the pressing of the heads of one plate into the receiving spaces of an opposed plate.

7. The fastener of claim 6 wherein each stem comprises a pair of cross-members formed adjacent to the walls defining the intersection point at which the stem is deployed.

* * * * *